United States Patent [19]

Lindner et al.

[11] Patent Number: 5,382,625
[45] Date of Patent: * Jan. 17, 1995

[54] THERMOPLASTIC MOULDING COMPOSITIONS WITH HIGH NOTCHED IMPACT STRENGTH

[75] Inventors: Christian Lindner, Cologne; Walter Uerdingen; Karl-Heinz Ott, both of Leverkusen; hans-Eberhard Braese, Cologne, all of Germany

[73] Assignee: Bayer Aktiengesellschaft, Leverkusen, Germany

[*] Notice: The portion of the term of this patent subsequent to Oct. 17, 2004 has been disclaimed.

[21] Appl. No.: 807,965

[22] Filed: Dec. 12, 1985

[30] Foreign Application Priority Data

Dec. 22, 1984 [DE] Germany .............................. 3447249

[51] Int. Cl.⁶ ...................... C08L 51/04; C08F 279/02
[52] U.S. Cl. ......................................... 525/81; 525/82; 525/83; 525/84; 525/85; 525/304; 525/310; 525/902

[58] Field of Search ................ 525/902, 310, 304, 82, 525/85, 81, 83, 84

[56] References Cited

U.S. PATENT DOCUMENTS

| | | | |
|---|---|---|---|
| 3,830,878 | 8/1974 | Kato et al. | 525/902 |
| 3,842,144 | 10/1974 | Tanaka et al. | 525/902 |
| 3,900,529 | 8/1975 | Beer | 525/902 |
| 3,956,424 | 5/1976 | Murayama et al. | 525/310 |
| 4,362,845 | 12/1982 | Kamata et al. | 525/310 |
| 4,393,172 | 7/1983 | Linder et al. | 525/310 |
| 4,421,901 | 12/1983 | Linder et al. | 525/902 |
| 4,461,868 | 7/1984 | Linder et al. | 525/902 |

*Primary Examiner*—Carman J. Seccuro, Jr.
*Attorney, Agent, or Firm*—Connolly & Hutz

[57] ABSTRACT

Particulate graft polymers composed of a core (a) of cross-linked diene rubber, a first envelope (b) of a cross-linked acrylate rubber, a second envelope (c) of a copolymer of resin-forming monomers and polyallyl monomers having at least three allyl groups in the molecule, and a third envelope (d) of a copolymer or homopolymer of resin forming monomers.

6 Claims, No Drawings

THERMOPLASTIC MOULDING COMPOSITIONS WITH HIGH NOTCHED IMPACT STRENGTH

This invention relates to particular thermoplastic graft polymers which constitute a particular arrangement of shells of selected polymers.

The graft polymers consist in principle of an acrylate rubber as a first shell containing a diene rubber as core and, surrounding the acrylate rubber, a second shell of a copolymer of resin-forming monomers and special polyallyl monomers, end an outer, third shell of a grafted-on copolymer of resin forming monomers.

There are already known polymers with high notched impact strength and other improved properties which are based on acrylate rubber having a defined core shell structure (EP-A 34,748).

Styrene/acrylonitrile graft polymers onto cross-linked acrylate rubbers in which a portion of the styrene/acrylonitrile polymer is cross-linked are also known (see U.S. Pat. No. 3,944,631). Products of this kind are tough with high age resistance.

It has been found that other properties of the product can be improved if both the elastomer phase and the resin phase of the graft polymers are given a specific gradient or shell structure, which involves using special comonomers. Such polymers have improved heat distortion temperature and when used in combination with other brittle resins improved processibility. They yield mouldings, in particular films, which are free from faults and irregularities.

The invention relates to a process for the preparation of particulate graft polymers, wherein (c) a mixture of resin-forming vinyl monomer and polyallyl monomers (having at least 3 allyl groups in the molecule) is graft-polymerised in emulsion in the presence of (b) 10 to 80% by weight, based on the graft polymer, of a particulate, highly cross-linked acrylate rubber having an average particle diameter ($d_{50}$) of from 0.2 to 1.0 μm in which the particles contain a core of a (a) diene rubber, and (d) the graft polymer thus obtained is graft-polymerised with at least one further vinyl monomer, the sum of (c) and (d) amounting to 90 to 20% by weight of the aforesaid graft polymer.

The invention further relates to the use of the particulate graft polymers described above, optionally in admixture with brittle thermoplastic resins, preferably copolymer, of styrene and acrylonitrile, α-methyl styrene and acrylonitrile, methyl methacrylate homopolymers or copolymers of vinyl chloride homopolymers or copolymer, as thermoplastic moulding compositions.

The present invention further relates to particulate graft polymers composed of a core (a) which is a cross-linked diene rubber, a first shell (b) which is a cross-linked acrylate rubber, a second shell (c) of a copolymer of resin-forming monomers and polyallyl monomer at least three allyl groups in the molecule, and a third shell (d) of a copolymer or homopolymer of resin-forming monomers, which are obtainable according to the above described process.

Those particulate graft polymers are preferred in which (A) the core (a) amounts to 0.5 to 10% by weight of the total weight of core (a) and shell (b), (B) the total weight of core (a) and shell (b) amounts to 10 to 80% by weight (in particular 27 to 70% by weight) of the total graft polymer, (C) the particles of core (a) with shell (b) have an average diameter of from 0.2 to 1 μm (in particular from 0.4 to 0.6 μm) $d(_{50}$ values), and (D) the shell (c) is present in quantities of from 2.5 to 20% by weight, based on the sum of the weights of shell (c) and shell (d).

The material of core (a) is a cross-linked rubber of one or more conjugated diene such as polybutadiene or a copolymer of a conjugated diene with an ethylenically unsaturated monomer such as styrene andlot acrylonitrile.

The first shell (b) consists of a cross-linked acrylate rubber and may, in particular, be a cross-linked polymer of acrylic acid alkyl esters, optionally mixed with up to 40% by weight of other vinyl monomers. Suitable polymerisable acrylic acid esters include $C_1$–$C_8$ alkyl esters such as, for example, methyl-, ethyl-, butyl-, octyl-, and 2-ethyl-hexyl esters and halogenated alkyl esters, preferably $C_1$–$C_8$ halogenated alkyl esters such as chloroethyl acrylate, and aromatic esters such as benzyl acrylate and phenethyl acrylate. They may be used singly or as mixtures, and the mixtures should contain at least one alkyl ester. Polyfunctional monomers are copolymer-lead for cross-linking. The following are examples: ester of unsaturated carboxylic acids with a polyol (preferably having 2 to 20 carbon atoms in the ester group), such as ethylene glycol dimethacrylate; esters of a polybasic carboxylic acid with an unsaturated alcohol (preferably having 8 to 30 carbon atoms in the ester moiety), such as triallyl cyanurate; triallyl isocyanurate; divinyl compounds such as divinyl benzene; esters of unsaturated carboxylic acids with unsaturated alcohols (preferably having 6 to 12 carbon atoms in the ester moiety) such as allyl methacrylate; phosphoric acid esters, for example triallyl phosphate and 1,3,5-triacryloyl-hexahydro-s-triazine. Particularly preferred polyfunctional monomers include triallyl cyanurate, triallyl isocyanurate, triallyl phosphate, allyl methacrylate, ethylene glycol dimethacrylate and 1,3,5-triacryloyl-hexahydro-s-triazinc, The quantity of polyfunctional monomers used for cross-linking is preferably from 0.05 to 5% by weight, in particular from 0.2 to 3.0% by weight of the mass of the first shell (b). The elastomer of the first shell (b) may in addition contain a copolymerisable monomer or several such monomers of the vinyl or vinylidene type incorporated by polymerisation. The following are example: methyl methacrylate, butyl acrylate, acrylonitrile, styrene, α-methyl styrene, acrylamides and vinyl-alkyl ethers. These comonomers may be incorporated by polymerisation in quantities of up to 40% by weight of polymer (b).

The second shell (c) consists of a graft-polymerised polymer of resin-forming monomers and polyallyl monomers having at least three allyl groups in the molecule. This envelope is prepared by copolymerisation of 99.9 to 90% by weight (in particular 99-95% by weight) of resin-forming monomers and 0.1 to 10 (in particular 1 to 5) percent by weight of polyallyl monomers.

The following are for example suitable as resin-forming monomers for the shell (c): α-methyl styrene, p-methyl styrene, styrene, halogenated styrene acrylonitrile methacrylonitrile, methyl methacrylates butyl methacrylate and vinyl chloride; preferably mixtures of styrene/acrylonitrile (proportions in the range of from 90:10 to 60:40), of methyl methacrylate/acrylonitrile and/or styrene (in proportions in the range of from 100:0 to 50:50) or of α-methyl styrene/acrylonitrile (in proportions in the range of from 75:25 to 6535), and terpolymers of α-methylstyrenes acrylonitrile and methyl methacrylate. Compounds having at least three allyl groups in the molecule are suitable for use as polyallyl monomers. These monomers may be cyclic or open-chained cyclic monomers being preferred. Also preferred are monomers in which the unsaturated olefinic groups consist exclusively of allyl groups, in other words monomers containing no vinyl of vinylidene groups. Allyl groups are unsubstituted groups corresponding to the following formula:

$CH_2=CH-CH_2-$

Examples of such polyallyl monomers include triallyl cyanurate, triallyl isocyanurates phosphoric acid triallyl esters citric acid allyl ester, triallyl triazine, triallyl benzene, polycarboxylic acid allyl esters such as polymethacrylic acid allyl esters, pentaerythritol allyl esters, glycerol triallyl ethers tris-allyloxy benzenes and polystyrenes having allyl or allyloxy groups in side chains. Triallyl cyanurate and triallyl isocyanurate are preferred.

The third shell (d) consists of a grafted polymer of resin-forming monomers. The following are suitable resin-forming monomers: α-methylstyrene, styrene, halogenated styrene, p-methyl styrene, acrylonitrile, methacrylonitrile and methyl methacrylate. Copolymers of styrene/acrylonitrile and copolymers containing methyl methacrylate are particularly preferred.

The graft polymer according to the invention can be prepared in aqueous emulsion as follows: a conjugated diene of the diene rubber is first prepared by emulsion polymerisation to form the core (a) in latex form. This method of polymerisation is known. The acrylate rubber for the first shell (b) is then prepared in the presence of this latex, also in aqueous emulsion, by emulsifying the monomers (main component at least one acrylate) in the latex and polymerising it in known manner with the aid of radical-forming initiators. The acrylate rubber polymerises on the diene rubber. It may already be cross-linked during its preparation by using polyfunctional monomers.

In this graft polymerisation of the first envelope (b), the formation of new particles must be prevented as far as possible. An emulsion stabilizer must be present in sufficient quantity to cover the surface of the particles. The size of these particles can be varied within wide limits by controlling the reaction coditions. If an agglomerated latex is used as the core (a) in order to obtain large particles, these particles may contain several diene rubber particles. Polymerisation of the first shell (b) can also be carried out in such a manner that particles having a core of diene rubber and particles of pure, cross-linked acrylate rubber are produced at the same time. Mixtures of this kind may under special circumstances also be used for producing impact-resistant moulding compositions.

When graft polymerisation of the acrylate rubber (shell (b)) has been completed, the second shell (c) is graft-polymerised on the resulting latex by introducing a mixture of the above mentioned resin forming vinyl monomers and polyallyl monomers according to the invention into the latex and graft-polymerising by means of radical initiators, in particular initiators of the water-soluble type. In one embodiment graft polymerization of shell is started when graft polymerisation of shell (c) is still taking place. This procedure has the effect that the proportion of polyallyl compound (as comonomer of the monomer forming the envelope (c)) continuously diminishes in the layer (c) (or particularly in the boundary region between layer (c) and layer (d)) from the interior to the exterior. This means that in the graft polymers according to the invention there is a gradual transition from shell (c) to the shell (d) and the structure of the shell must therefore differ from that of shells in which graft polymerisation of (d) is begun only after graft polymerisation of (c) has been completed.

For the graft polymerisation of the vinyl monomers forming the thermoplastic shell (d) on the previously formed latex particles of (a), (b) and to a certain extent (c), vinyl monomers, as already stated above, are polymerised by radical polymerisation in emulsion, temperatures of from 40° to 90° C., in particular from 50° to 75° C., normally being particularly suitable for this purpose.

It should be mentioned that not only is (d) graftpolymerised on (c) but also (c) is graft-polymerised on (b) and (b) is graft-polymerised on (a). In the polymerisation processes carried out according to the invention, the graft polymers according to the invention are formed and the various shells develop. In these known processes of graft polymerisation, which are normally carried out in the presence of radical initiators, e.g. water-soluble initiators, emulsifiers or complex formers as well as molecular weight regulators, formation of the graft polymer is generally accompanied by the formation of a certain amount of free polymers or copolymers of the monomers of which the shell is formed. The quantity of such ungrafted polymer can be defined by the degree of grafting or the grafting yield and depends inter alia on the polymerisation conditions, the composition of the grafting base, the size of particles to be grafted-on and the quantity of graft bases. "graft polymer" within the meaning of this invention is therefore the product obtained by the polymerisation of vinyl monomers in the presence of the rubber latex and therefore strictly speaking a mixture of graft polymer and free copolymer of the graft monomers.

The graft polymers prepared as described above can be processed by known methods, e.g. by coagulation of the latices with electrolytes (salts, acids or mixtures thereof) followed by purification and drying OF by spray drying.

The graft polymers according to the invention are thermoplastic moulding compositions with high notched impact strength, high stability to weathering and ageing and improved heat distortion temperature and improved processibility. It was particularly surprising to find that thermoplastic processing of the graft polymer according to the invention via the molten state was not impaired by the presence of shell (c) which in fact had a positive influence on the surface properties of, for example, injection moulded or extruded articles. Thus, for example, extruded films frequently have lumps which have a very deleterious effect on their mechanical strength. The graft polymers according to the invention give rise to mouldings which have a substantially reduced tendency to the formation of such lumps. It was particularly surprising that the above described advantages over the known acrylate rubber moulding compositions are most pronounced when the special polyallyl monomers are used for constructing the shell (c).

The graft polymer according to the invention is directly suitable for further use as a moulding composition if the core (a) and first shell (b) amount to about 5 to 40% by weight, based on the total graft polymer. If the content of (a)+(b) is higher than this amount, a brittle resin can be added to it. The brittle resins used are preferably styrene, methyl methacrylate and acrylonitrile tarpolymers, styrene or α-methyl styrene and acrylonitrile copolymers, styrene, acrylonitrile and acrylic ester terpolymers or methyl methacrylate homopolymers or copolymers or vinyl chloride homopolymers or copolymers.

The moulding compositions according to the invention can contain dyes and pigments, stabilizers against the action of light and heat, plasticizers, foaming agents and organic or inorganic fillers in the form of granules, powder or fibres. The moulding compositions may be shaped, for example, by injection moulding or extrusion and are suitable for producing moulded articles of all kinds which are required to be weather resistant and impact resistant. They may be used, for example, as an external layer of a laminate composed of several different polymers.

The parts and percentages given in the following working Examples are by weight.

EXAMPLES

1. Preparation of a Graft Polymer According to the Invention

1.1 Polydiene Latex (Core (a))

The following emulsion was polymerised at 65° C. with stirring in a reactor for about 22 hours until virtually all the monomer had been converted:

| | |
|---|---|
| 90.0 parts by weight | butadiene |
| 10.0 parts by weight | styrene |
| 1.8 parts by weight | sodium salt of disproportionated abietic acid |
| 0.257 parts by weight | sodium hydroxide |
| 0.3 parts by weight | n-dodecyl mercaptan |
| 1.029 parts by weight | sodium ethylene diamino tetraacetate |
| 0.023 parts by weight | potassium persulphate |
| 122 parts by weight | water |

A latex containing butadiene;styrene copolymer particles having an average diameter ($d_{50}$) of 0.1 μ at a concentration of about 40% is obtained. (The average diameter $d_{50}$ is that which is smaller than 50% by weight of all the particles and larger than 50% by weight of all the other particles).

1.2 Acrylate Rubber Latex with Polydiene Core (Core (a)) and Shell (b)

The following are introduced into a reactor: 9.5 parts by weight of latex 1.1 and 286 parts by weight of water. When the reaction mixture has been heated to 65° C., 22 parts by weight of solution 1) are added and polymerisation is then initiated by means of a solution of 0.75 parts by weight of potassium peroxy disulphate in 18 parts by weight of water.

The remainder of solution 1) and solution 2) are then introduced into the reactor at a uniform rate at 65° C. within 5 hours. After all the components have been added, polymerisation is continued for 4 hours at 65° C. until completed.

The latex obtained contains the polymer at a concentration of 37% by weight and has an average particle diameter ($d_{50}$) value of 0.42 μm.

Solution 1: n-butyl acrylate 575 parts by weight triallyl cyanurate 0.914 parts by weight Solution 2: Lewatite water 640 parts by weight sodium C14–18 alkyl sulphonate 5.4 parts by weight.

1.3 Preparation of the Remaining Shells (c) and (d)

The following are introduced into a reactor: 47 parts by weight of latex 1.2 and 57 parts by weight of water. After the reaction mixture has been heated to 75° C., the following monomer solution is introduced into the reactor:

| | |
|---|---|
| styrene | 3.465 parts by weight |
| acrylonitrile | 1.785 parts by weight |
| triallylcyanurate | 0.105 parts by weight |

Polymerisation is then initiated by the addition of a solution of 0.49 parts by weight of potassium peroxy disulphate in 10 parts by weight of water.

The following solutions are then introduced into the reactor at a uniform rate over a period of 7 hours at 75° C.

| | | |
|---|---|---|
| Solution 1: | Styrene | 31.4 parts by weight |
| | Acrylonitrile | 16.2 parts by weight |
| Solution 2: | Water | 45 parts by weight |
| | Sodium $C_{14-18}$- Alkyl sulphonate | 1.05 parts by weight |

Heating to 75° C. and stirring are continued for 4 hours to complete the polymerisation.

The resulting latex has a solids content of 33% by weight. For working up of the polymer, see section 8.

2. Comparison: Graft Polymer Without the Shell (c)

The following are introduced into a reactor: 47 parts by weight of latex 1.2 and 57 parts by weight of water. After the reaction mixture has been heated to 75° C., a solution of 0.49 parts by weight of potassium peroxy disulphate in 10 parts by weight of water is introduced into the reactor. The following two solutions are then added at a uniform rate over a period of 7 hours at 75° C.

| | | |
|---|---|---|
| Solution 1: | Styrene | 34.95 parts by weight |
| | Acrylonitrile | 18.00 parts by weight |
| Solution 2: | water | 45 parts by weight |
| | Sodium $C_{14-18}$- alkyl sulphonate | 1.05 parts by weight |

Stirring at 75° C. is continued for 4 hours to complete the polymerisation.

The resulting latex has a solids content of 33% by weight.

For working up of the polymer, see section 8.

3. Comparison: Graft Polymer Prepared by a Process Not According to the Invention.

The following are introduced into a reactor flask: 47 parts by weight of latex 1.2 and 57 parts by weight of water. After the reaction mixture has been heated to 75° C., the following monomer solution is introduced into the reactor:

| | |
|---|---|
| Styrene | 3.465 parts by weight |
| Acrylonitrile | 1.785 parts by weight |
| Triallylcyanurate | 0.105 parts by weight. |

Polymerisation is then initiated by the addition of a solution of 0.45 parts by weight of potassium of peroxy disulphate in 100 parts by weight of water. The monomers have completely polymerised after a polymerisation time of 1.5 hours.

The following solutions are then introduced into the reactor at a uniform rate at 75° C. within a period of 7 hours, polymerisation being reactivated by the addition of 0.1 part by weight of potassium peroxy disulphate in water:

| Solution 1: | Styrene | 31.4 parts by weight |
|---|---|---|
| | Acrylonitrile | 16.2 parts by weight |
| Solution 2: | Water | 45 parts by weight |
| | Sodium $C_{14-18}$-alkyl sulphonate | 1.05 parts by weight. |

Stirring is continued for 4 hours at 75° C. to complete the polymerisation. The resulting latex has a polymer solids content of 33% by weight.

For working up of the product, see section 8.

4. Comparison: Graft Polymers Without Polyallyl Compound

The procedure according to 1 is repeated but with the following modification:

In stage 1.3, 0.105 parts by weight of butylene glycol diacrylate are used instead of 0.105 parts by weight of triallyl cyanurate.

5. Preparation of a Graft Polymer According to the Invention

The procedure described under 1) is repeated but with the modification that in Stage 1.3, 47.6 parts by weight of methyl methacrylate are used in solution 1) instead of styrene/acrylonitrile.

6. Preparation of a Graft Polymer According to the Invention 6.1 The following emulsion is polymerised in accordance with instructions 1.1 at 60°–68° C. in the course of about 110 hours:
100 Parts by weight of butadiene
70 Parts by weight of water
1.146 Parts by weight of sodium salt of disproportionated abietic acid
0.055 Parts by weight of sodium ethylene diaminotetraacetic acid
0.137 Parts by weight of sodium hydroxide
0.028 Parts by weight of sodium bicarbonate
0.282 Parts by weight of potassium persulphate.

A latex containing polybutadiene particles with an average diameter ($D_{50}$) of 0.4 μm at a concentration of 58% is obtained.

6.2 The following are introduced into a reactor at 65° C.:
2168 Parts by weight of latex 6.1
9500 Parts by weight of water
27 Parts by weight potassium persulphate
1700 Parts by weight water.

The following mixtures are then introduced separately into the reactor at 65° C. within a period of 4 hours:

Solution 1: n-butyl acrylate 9214 parts by weight
triallyl cyanurate 15 parts by weight
Solution 2: water 6600 parts by weight sodium sulphonate of 156 parts by weight of a $C_{14-18}$ hydrocarbon.

Polymerisation is then completed by heating to 65° C. for 4 hours. The latex obtained has a broad particle size distribution ranging from 0.2 to 0.9 μm and a solids content of 35% by weight.

6.3 The following are introduced into a reactor: 50 parts by weight of latex 6.2 and 60 parts by weight of water. After the reaction mixture has been heated to 70° C., the following monomer solution is introduced into the reactor:
Styrene 3.8556 parts by weight
acrylonitrile 1.2994 parts by weight
triallyl cyanurate 0.20 parts by weight.

Polymerisation is then initiated by the addition of a solution of 0.6 parts by weight of potassium peroxy disulphate in 10 parts by weight of water.

The following solutions are then introduced at a uniform rate into the reactor at 70° C. over a period of 6 hours:

| Solution 1: | Styrene | 34.3 parts by weight |
|---|---|---|
| | acrylonitrile | 13.3 parts by weight |
| Solution 2: | water | 45 parts by weight |
| | Sodium $C_{14-18}$-alkyl sulphonate | 1.5 parts by weight. |

The reaction mixture is then heated to 75° C. for a further 4 hours with stirring to complete the polymerisation. The resulting latex has a polymer solids content of 34% by weight. The polymer is worked up as described in section 8.

7. The instructions given under 6.2 are repeated but with the modification that, instead of introducing latex 6.1, the corresponding quantity of water is introduced into the reactor. The procedure is otherwise as described under 6.2.

8. Working Up of the Graft Polymer Emulsions

After bein stabilized with 1.2 parts by weight of phenolic antioxidants, based on 100 parts of polymer, the emulsions are precipitated with a coagulating solution of magnesium sulphate and acetic acid, washed with water and dried. The resulting polymer powders are then worked up thermoplastically.

9. Test Method

After granulation, standard test rods are prepared from the powders at 220° C. and these rods are tested by DIN methods for notched impact strength, hardness and heat distortion temperature (Vicat B).

TABLE 1

| Polymer | Notched impact strength 23° C. (kg/m$^2$) | ball indentation hardness (39 s) | heat distortion temperature Vicat B (°C.) | surface of an extruded film (lumps)* |
|---|---|---|---|---|
| 1 | 13 | 88 | 95 | free of lumps |
| 2**) | 12.8 | 85 | 90 | containing lumps |
| 3**) | 11.0 | 90 | 90 | containing lumps |
| 4**) | 11.1 | 91 | 90 | containing lumps |
| 5 | 14.5 | 84 | 94 | free from lumps |
| 6 | 15.3 | 88 | 95 | free from lumps |
| 7**) | 13 | 90 | 90 | lumps and streaks |

*)assessed visually
**)comparison experiment

As may be seen, the moulding compositions based on graft polymers 1, 5 and 6 acording to the invention are distinguished by their improved mechanical properties and surface quality.

10. Moulding Compositions Containing Graft Polymers According to the Invention and PC 50 parts by weight of suspension PVC (having a K-value of 70), 15 parts by weight of trimellitic acid-$C_1$-$C_{11}$-alkyl ester, 10 parts by weight of a copolymer of 70% by weight of vinyl acetate and 30% by weight of ethylene and a graft polymer (50 parts by weight) are rolled for 15 minutes at 180° C. The resulting compound is then pressed to a film 1 mm in thickness at 190° C. The properties of the films are shown in Table 2.

TABLE 2

| Compound based on graft polymer | Elongation R% | Shore Hardness °C. | Vicat A (°C.) softening temperature |
|---|---|---|---|
| 1 | 26 | 62 | 87 |
| 2 | 24 | 60 | 80 |

As may be seen, a PVC moulding composition based on graft polymer 1, according to the invention has advantageous product properties in general together with improved softening temperature.

We claim:

1. A particulate graft polymer comprising a core and three shells wherein the core (a) is a cross-linked diene rubber, the first shell (b) is a cross-linked acrylate rubber, the second shell (c) is a copolymer of 99.9 to 90% by weight resin-forming vinyl monomers selected from the group consisting of styrene, alpha methyl styrene, halogenated styrene, p-methyl styrene, acrylonitrile, methacrylonitrile, methyl methacrylate, butyl methacrylate, vinyl chloride, styrene and acrylonitrile or methylmethacrylate and acrylonitrile or alpha methyl styrene and acrylonitrile, and terpolymers of alpha methylstyrene, acrylonitrile and methylmethacrylate, and 0.1 to 10% by weight of polyallyl monomers having at least three allyl groups in each monomer molecule, and the third shell is a copolymer or homopolymer of resin-forming vinyl monomers selected from the group consisting of styrene, alpha methyl styrene, halogenated styrene, acrylonitrile, methacrylonitrile, and methylmethacrylate.

2. A particulate graft polymer according to claim 1, in which the core (a) is present in a quantity of from 0.5 to 10% by weight, based on the total mixture of core (a) and shell (b), 3. A particulate graft polymer according to claim 1, in which the total quantity of core (a) and shell (b) amounts to 10 to 80% by weight of the total graft polymer and the particles of core (a) and shell (b) have an average diameter ($d_{50}$) of from 0.2–1 μm.

4. A particulate graft polymer according to claim 1, in which the shell (c) is present in a quantity of from 2.5 to 20% by weight, based on the sum of the weights of shell (c) and shell (d).

5. A thermoplastic moulding composition comprising a particulate graft polymer according to claim 1.

6. A thermoplastic moulding composition according to claim 5, which contains additionally a brittle thermoplastic resin selected from a copolymer of styrene and acrylonitrile, a copolymers of α-methyl styrene and acrylonitrile a methyl methacrylate homo- or copolymer and a vinyl chloride homo- or copolymer.

* * * * *